Patented Aug. 23, 1932

1,873,154

UNITED STATES PATENT OFFICE

LÉOPOLD RUZICKA, OF DE BILT, NEAR UTRECHT, NETHERLANDS, ASSIGNOR TO SOCIETE ANONYME M. NAEF & CIE., OF GENEVA, SWITZERLAND, A SWISS FIRM

PROCESS FOR THE PREPARATION OF CYCLIC NON-SATURATED KETONES WITH MORE THAN NINE RING MEMBERS

No Drawing. Application filed September 9, 1929, Serial No. 391,517, and in Switzerland October 9, 1928.

In my prior Patents Nos. 1,673,093 and 1,702,842-52 I have described processes for the preparation of monocyclic saturated ketones and their alkyl derivatives having more than nine ring members, in which dicarboxylic acids having more than ten ring members or the thorium or cerium salts thereof, or the alkyl derivatives of the said acids, are subjected to the usual ketone preparation methods.

I have found that the described process for forming saturated ketones may also be applied for preparing non-saturated cyclic ketones by heating a normal straight chain non-saturated dicarboxylic acid salt, said acid having in a normal chain at least eleven carbon atoms, the two carboxylic acid groups being linked to the end carbons thereof.

The salts of which use can advantageously be made, are the compounds of uranyl ($UO_2$) or of the following metals: aluminium, scandium, titanium, yttrium, zirconium, lanthanium, cerium, praseodymium, neodymium, samarium, europium, gadolinium, terbium, dysprosium, holmium, erbium, thulium, ytterbium, lutecium, hafnium. Such ketones have a smell generally corresponding to the typical musk or civet smell and can therefore be used as well as odorizing products as for the preparation of other interesting technical preparations.

Example 1

The yttrium salt of the pentadecene-(7)-dicarboxylic-(1.15) acid is heated, preferably in a vacuum, from 300 to 500 degrees centigrade and the distillate which results subjected to fractional distillation, then the part passing over at 110–170 degrees centigrade (0.5 m/m) treated with semi-carbazide or another of the reagents usually employed for isolating the ketones.

The cyclo-hexadecene-8-one-1 may thus be isolated by means of the action of the acids on the semi-carbazone which is purified by crystallization in alcohol and which melts at about 181 degrees centigrade.

The pure ketone thus obtained melts at 22 degrees centigrade and boils at 193 degrees centigrade (19 m/m).

$$d_4^{45} = 0.9122 \quad n_D^{42} = 1.4804$$

Example 2

The thorium salt of the hexadecene-(8)-dicarboxylic-(1.16) acid is heated, preferably in a vacuum, from 300 to 500 degrees centigrade and the distillate which results subjected to fractional distillation, then the part passing over at 120–180 degrees centigrade (0.5 m/m) treated as indicated in Example 1. There is obtained the cyclo-heptadecene-(9)-one-(1) which is identical with the civettone.

What I claim is:

1. A process of preparing mono-cyclic non-saturated ketones having more than nine ring members which comprises heating a normal straight chain non-saturated dicarboxylic acid salt, said acid having in a normal chain at least eleven carbon atoms, the two carboxylic acid groups being linked to the end carbons thereof.

2. A process of preparing cyclic non-saturated ketones having more than nine members which comprises heating a normal straight chain non-saturated dicarboxylic acid salt of a rare earth metal, said dicarboxylic acid having in a normal chain at least eleven carbon atoms, the two carboxylic acid groups being linked to the end carbons thereof.

3. A process of preparing cyclic non-saturated ketones having more than nine ring members which comprises heating the yttrium salt of the penetadecene-7-dicarboxylic-1,15-acid.

4. A process of preparing cyclic non-saturated ketones having more than nine ring members which comprises heating the thorium salt of the hexadecene-8-dicarboxylic-1,16-acid.

5. The cyclic non-saturated ketones which melt at 22° C. and boil at 193° C. having the structure cyclo-hexadecene-8-one-1.

In testimony whereof I have affixed my signature.

LÉOPOLD RUZICKA.